No. 671,314.　　　　　　　　　　　　　　Patented Apr. 2, 1901.
T. A. EDISON.
LUBRICATING JOURNAL BEARINGS.
(Application filed June 29, 1897.)
(No Model.)
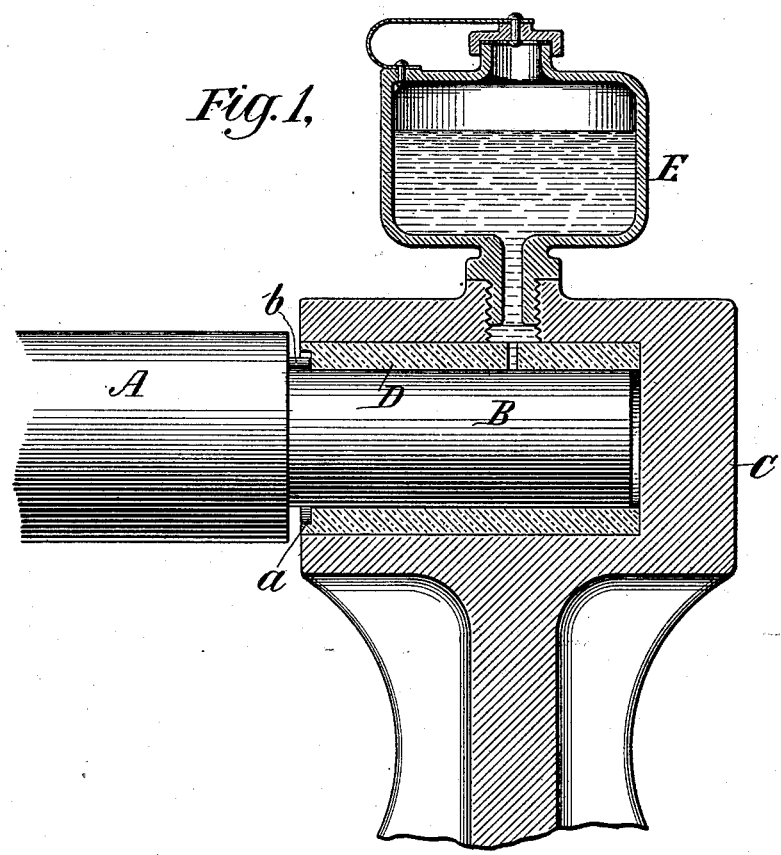
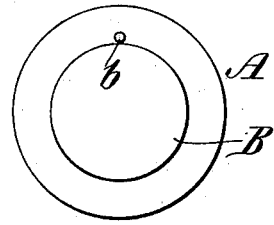
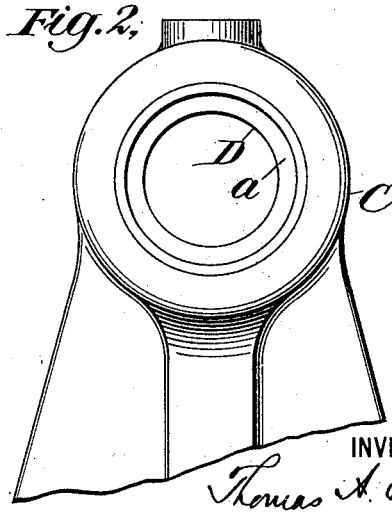
WITNESSES:　　　　　　　　　　　　　　　　　INVENTOR
　　　　　　　　　　　　　　　　　　　　　　Thomas A. Edison
　　　　　　　　　　　　　　　　　　　　BY
　　　　　　　　　　　　　　　　　　　　Dyer & Driscoll
　　　　　　　　　　　　　　　　　　　　ATTORNEYS

UNITED STATES PATENT OFFICE.

THOMAS A. EDISON, OF LLEWELLYN PARK, NEW JERSEY.

LUBRICATING JOURNAL-BEARINGS.

SPECIFICATION forming part of Letters Patent No. 671,314, dated April 2, 1901.

Application filed June 29, 1897. Serial No. 642,815. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Lubricating Journal-Bearings, (Case No. 982,) of which the following is a specification.

In my mill for pulverizing, screening, and concentrating iron ore I have found great difficulty in lubricating the journal-bearings of the machinery employed, arising from the presence of dust with which the air is surcharged. I have overcome the difficulty by the production of an oiler which is dependent for its successful operation upon the presence of dust. This I accomplish by leaving the bearing open at one or both ends, the escape of the oil being prevented by the formation of a dust-cap around the opening and by providing a device which acts periodically to detach the dust-cap and allow the exhausted oil to escape from the bearing and a fresh supply of oil to take its place before the dust-cap is re-formed. This device for effecting the periodic detaching of the dust-cap is of very simple construction, and consists merely of a pin attached to the shaft and moving in a groove in which the open end of the bearing terminates. This groove becomes filled with dust, forming the dust-cap, which prevents the escape of the oil from the bearing. The pin traveling through this dust mixes the oil with it, and the mixture becomes first thick, then ropy, and then crumbly and falls out of the groove. The dust-cap begins at once to re-form; but before the escape of oil from the bearing is materially checked the exhausted oil has run out of the bearing and a fresh supply from the oil-cup has taken its place. This means for lubricating journal-bearings is applicable to all kinds of bearings located in an atmosphere charged with dust—to those that are stationary as well as to traveling bearings on conveyers or the like. The journal may be closed at one end, the dust-cap being formed only at the other end, or the journal may run through the bearing and the dust-cap be formed at each end. The oil is supplied from a suitable cup attached midway of the bearing or at the closed end. I have found this means of oiling bearings exceedingly effective, not only overcoming the difficulties arising from the presence of dust, but utilizing that material to effect an automatic and periodic renewal of the oil in the bearing, thus enabling the oil to do its work in the most effective manner.

In the accompanying drawings, Figure 1 is a sectional view showing my lubricating device applied to a bearing closed at one end. Fig. 2 is an elevation of the open end of the bearing, showing the groove in which the dust-cap is formed; and Fig. 3 is an end view of the journal, showing the mixing-pin.

A is the shaft, which in the illustration given is reduced at its end to form the journal B.

C is the bearing, closed at its outer end and having a bushing D, in which the journal B turns. Upon the top of the bearing is the oil-cup E. The journal is sufficiently loose in the bearing to allow a free escape of the oil through the open inner end of the bearing. The inner end of the bushing D has a groove *a*, in which travels a pin *b*, carried by the shaft A.

The operation of the parts will be clear from the foregoing description.

What I claim is—

1. The combination of a journal, a bearing having means for delivering oil thereto and an opening or space contiguous to the journal for the escape of oil therefrom, and means for effecting the periodic detachment of dust accumulating at said opening or space, substantially as and for the purposes set forth.

2. The combination of a journal, a bearing having means for delivering oil thereto and an opening or space around the journal for the escape of oil therefrom, and means for effecting the periodic detachment of dust accumulating at said opening or space, substantially as and for the purposes set forth.

3. In a journal-bearing adapted for use in a dust-laden atmosphere, the combination of a journal, a bearing having an opening or space through which oil can exude onto the journal, the journal being exposed to the atmosphere at such opening or space, and means for agitating the mass of oil and dust formed at such space, whereby the dust-cap is periodically removed, substantially as and for the purposes set forth.

4. The combination of a journal, a bearing, means for supplying oil to them, an oil-outlet exposed to the atmosphere, and means for traversing the opening, as and for the purpose set forth.

5. The combination of a journal, a bearing, an oil-supply for them, the bearing being open at the end and there exposed to the atmosphere, and means for traversing the bearing adjacent to its open end, as and for the purpose set forth.

6. The combination of a journal, a bearing, means for supplying oil to them, a groove at the open end of the bearing and exposed to the atmosphere, and a pin on the journal and extending into the groove, as and for the purpose set forth.

7. The combination of a bearing for operating in an atmosphere charged with dust, a journal mounted in said bearing, means for supplying oil to the interior of the bearing, whereby the oil may flow out of the bearing around the journal, the bearing being adapted to be periodically closed, substantially as described, around the journal by the formation of a dust-cap, and means for periodically removing such dust-cap, whereby oil may flow out of the bearing and be replaced by fresh oil, substantially as set forth.

8. The combination of a bearing for operating in an atmosphere charged with dust, a journal mounted in said bearing, means for supplying oil to the interior of the bearing, whereby the oil may flow out of the bearing around the journal, the bearing being adapted to be periodically closed, substantially as described, around the journal by the formation of a dust-cap, and means for mixing the dust and the oil constituting said dust-cap, whereby the dust-cap will become crumbly and will periodically detach itself to allow the oil to flow out of the bearing and be replaced by fresh oil, substantially as set forth.

9. The combination of a bearing having a groove at one end, a shaft, a journal in the bearing, a pin working in the groove, and means for supplying oil to the bearing, substantially as set forth.

This specification signed and witnessed this 10th day of June, 1897.

THOMAS A. EDISON.

Witnesses:
RICHARD N. DYER,
W. PELZER.